(12) United States Patent
Ryu et al.

(10) Patent No.: US 12,148,881 B2
(45) Date of Patent: Nov. 19, 2024

(54) COMPOSITE ELECTROLYTE MEMBRANE AND ALL-SOLID-STATE BATTERY COMPRISING THE COMPOSITE ELECTROLYTE MEMBRANE

(71) Applicant: LG CHEM, LTD., Seoul (KR)

(72) Inventors: Ji-Hoon Ryu, Daejeon (KR); Eun-Bee Kim, Daejeon (KR); Suk-Woo Lee, Daejeon (KR); Jung-Pil Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 785 days.

(21) Appl. No.: 17/260,058

(22) PCT Filed: Oct. 10, 2019

(86) PCT No.: PCT/KR2019/013300
§ 371 (c)(1),
(2) Date: Jan. 13, 2021

(87) PCT Pub. No.: WO2020/076099
PCT Pub. Date: Apr. 16, 2020

(65) Prior Publication Data
US 2021/0280908 A1    Sep. 9, 2021

(30) Foreign Application Priority Data

Oct. 11, 2018  (KR) .................. 10-2018-0121266

(51) Int. Cl.
*H01M 10/0565*    (2010.01)
*H01M 10/0525*    (2010.01)
(Continued)

(52) U.S. Cl.
CPC ... *H01M 10/0565* (2013.01); *H01M 10/0525* (2013.01); *H01M 10/0562* (2013.01); *H01M 10/0585* (2013.01); *H01M 2300/0094* (2013.01)

(58) Field of Classification Search
CPC .................................. H01M 10/0565
See application file for complete search history.

(56) References Cited

U.S. PATENT DOCUMENTS

| 6,692,873 B1 | 2/2004 | Park et al. |
| 8,338,019 B2 | 12/2012 | Lee et al. |

(Continued)

FOREIGN PATENT DOCUMENTS

| CN | 101861667 A | 10/2010 |
| CN | 103972580 A | 8/2014 |

(Continued)

OTHER PUBLICATIONS

Extended European Search Report dated Oct. 4, 2021 for Application No. 19871907.2.

(Continued)

*Primary Examiner* — Barbara L Gilliam
*Assistant Examiner* — Jordan E Berresford
(74) *Attorney, Agent, or Firm* — Birch, Stewart, Kolasch & Birch, LLP

(57) ABSTRACT

A composite electrolyte membrane according to the present disclosure includes a phase change layer on a surface in contact with an electrode, for example, a positive electrode. The phase change layer includes a filler, and a physically isolated area between the positive electrode and the composite electrolyte membrane, known as a dead space, is filled with the filler that is liquefied by heat resulting from the (Continued)

increased internal temperature of the battery, thereby reducing the interfacial resistance between the electrolyte membrane and the electrode.

9 Claims, 5 Drawing Sheets

(51) Int. Cl.
  *H01M 10/0562* (2010.01)
  *H01M 10/0585* (2010.01)

(56) References Cited

U.S. PATENT DOCUMENTS

| | | | |
|---|---|---|---|
| 11,342,577 B2 | 5/2022 | Ryu et al. | |
| 11,476,498 B2 | 10/2022 | Ryu et al. | |
| 2008/0292968 A1* | 11/2008 | Lee | H01M 10/052 |
| | | | 429/247 |
| 2009/0239152 A1 | 9/2009 | Katoh | |
| 2010/0075232 A1* | 3/2010 | Dasgupta | H01M 10/052 |
| | | | 429/309 |
| 2012/0227926 A1 | 9/2012 | Field et al. | |
| 2013/0260257 A1 | 10/2013 | Choi et al. | |
| 2014/0120402 A1 | 5/2014 | Yu et al. | |
| 2015/0357626 A1* | 12/2015 | Holman | H01M 4/36 |
| | | | 264/49 |
| 2017/0092975 A1 | 3/2017 | Kim et al. | |
| 2018/0159169 A1* | 6/2018 | Ko | H01M 10/0565 |

FOREIGN PATENT DOCUMENTS

| | | | |
|---|---|---|---|
| CN | 110832687 A | | 2/2020 |
| CN | 110915051 A | | 3/2020 |
| JP | 9-22726 A | | 1/1997 |
| JP | 9-293518 A | | 11/1997 |
| JP | 2000-164255 A | | 6/2000 |
| JP | 2006-16550 A | | 1/2006 |
| JP | 2006-120368 A | | 5/2006 |
| JP | 2007-329107 A | | 12/2007 |
| JP | 2008-18550 A | | 1/2008 |
| JP | 2013-131503 A | | 7/2013 |
| JP | 2015-88478 A | | 5/2015 |
| JP | 2016048650 A | * | 4/2016 |
| JP | 2017-208250 A | | 11/2017 |
| JP | 6253149 B2 | | 12/2017 |
| KR | 10-2001-0016920 A | | 3/2001 |
| KR | 10-2013-0022395 A | | 3/2013 |
| KR | 10-2013-0111833 A | | 10/2013 |
| KR | 10-2017-0037533 A | | 4/2017 |
| KR | 10-1761176 B1 | | 7/2017 |
| KR | 10-2017-0141498 A | | 12/2017 |
| KR | 10-2018-0015843 A | | 2/2018 |
| WO | WO 2018/183771 A1 | | 4/2018 |

OTHER PUBLICATIONS

International Search Report issued in PCT/KR2019/013300 (PCT/ISA/210), dated Jan. 23, 2020.
Indian Office Action for Appl. No. 202117012699 dated Oct. 19, 2022 (w/ English translation).

* cited by examiner

COMPOSITE ELECTROLYTE MEMBRANE AND ALL-SOLID-STATE BATTERY COMPRISING THE COMPOSITE ELECTROLYTE MEMBRANE

TECHNICAL FIELD

The present application claims the benefit of Korean Patent Application No. 10-2018-0121266 filed on Oct. 11, 2018 with the Korean Intellectual Property Office, the disclosure of which is incorporated herein by reference in its entirety. The present disclosure relates to a composite solid electrolyte membrane including an electrolyte layer and a phase change layer and an all-solid-state battery comprising the same.

BACKGROUND ART

Recently, there has been an increasing interest in energy storage technology day by day. As the application field of energy storage technology has been extended to mobile phones, camcorders, lap-top computers, and even electric cars, many efforts have been devoted to studying and developing electrochemical devices. In this aspect, electrochemical devices are attracting more attention, and especially, development of rechargeable secondary batteries is the focus of attention, and more recently, in the development of batteries, new electrode and battery design for improving the capacity density and specific energy have been studied and developed.

In currently available secondary batteries, lithium secondary batteries developed in early 1990's have much higher operating voltage and energy density than traditional batteries using an aqueous electrolyte solution such as Ni-MH, Ni—Cd and lead-acid batteries, and by virtue of these advantages, lithium secondary batteries are gaining much attention.

The lithium secondary batteries have used liquid electrolytes (electrolyte solutions), for example, combustible organic solvents. However, batteries using liquid electrolytes have a high risk of electrolyte leaks, fires and explosions. To find fundamental safety solutions to these problems, many studies using solid electrolytes instead of liquid electrolytes have been made. A battery, in which all components including an electrolyte are solid, is referred to as an all-solid-state secondary battery. Attention is paid to an all-solid-state battery as a next-generation lithium secondary battery in terms of safety, high energy density, high output and a simple manufacturing process.

However, in the all-solid-state battery including the solid electrode and the solid electrolyte membrane and not a liquid electrolyte, there is a dead space, namely, an ionically isolated gap, in the interface between the electrode and the solid electrolyte membrane.

Particularly, the less the electrode surface is uniform due to the shape of the electrode active material, coagulation of the conductive material or swelling of the binder polymer, there are more dead spaces and the higher the resistance between the electrode and the solid electrolyte membrane is, which affects the life performance of the battery adversely.

To solve the problem, there are attempts to add a liquid electrolyte to the all-solid-state battery. However, liquid electrolyte injection performed after assembling of an electrode assembly requires excess liquid electrolytes, and the injected liquid electrolyte softens the solid electrolyte membrane.

Additionally, when lithium metal is used for the negative electrode active material, the electrode thickness increases and the cycling characteristics degrade due to dendrite growth on the surface of the negative electrode during repeated charging/discharging.

DISCLOSURE

Technical Problem

To solve the above-described problem, the present disclosure is directed to providing a composite electrolyte membrane including a phase change layer. The present disclosure is further directed to providing an all-solid-state battery comprising the composite electrolyte membrane. These and other objects and advantages of the present disclosure will be understood from the following description. It will be readily understood that the objects and advantages of the present disclosure may be realized by the means or methods set forth in the appended claims and a combination thereof.

Technical Solution

To achieve the above-described object, the present disclosure relates to a composite electrolyte membrane for an all-solid-state battery. A first aspect of the present disclosure relates to the composite electrolyte membrane including an electrolyte layer and a phase change layer stacked in a sequential order, wherein the phase change layer includes a porous sheet including a plurality of pores, and a filler with which the pores of the porous sheet are filled, wherein the porous sheet includes polymer resin, and the filler exists in a solid state at 26° C. or less and a liquid state at 35° C. or above.

According to a second aspect of the present disclosure, in the first aspect, the filler may include at least one selected from the group consisting of ethylene carbonate (EC), polyethylene glycol (PEG) having a weight average molecular weight of 1,000 or above, succinonitrile (SN) and cyclic phosphate (CP).

According to a third aspect of the present disclosure, in the first or second aspect, the electrolyte layer may include a sulfide-based solid electrolyte, an oxide-based solid electrolyte and a polymer-based solid electrolyte, and the polymer-based solid electrolyte may include polymer resin and a lithium salt.

According to a fourth aspect of the present disclosure, in any one of the first to third aspects, the electrolyte layer may include a polymer resin layer including polymer resin, and a lithium salt layer including a lithium salt coated on all or at least part of a surface of the polymer resin layer in contact with the phase change layer among two surfaces of the polymer resin layer.

According to a fifth aspect of the present disclosure, in any one of the first to fourth aspects, the electrolyte layer may include polymer resin and a lithium salt, the polymer resin may include at least one selected from polyether-based polymer, polycarbonate-based polymer, acrylate-based polymer, polysiloxane-based polymer, phosphagen-based polymer, a polyethylene derivative, an alkylene oxide derivative, phosphoric acid ester polymer, poly agitation lysine, polyester sulfide, polyvinyl alcohol and polyvinylidene fluoride, and the lithium salt and the polymer resin may be mixed at a mole ratio of 1:5 to 1:30.

According to a sixth aspect of the present disclosure, in any one of the first to fifth aspects, the porous sheet may be a film or a non-woven fabric including a polyolefin-based polymer resin, with a porosity of 30 vol % to 80 vol %.

A seventh aspect of the present disclosure relates to an all-solid-state battery, and the all-solid-state battery includes a negative electrode, a positive electrode and a composite electrolyte membrane interposed between the negative electrode and the positive electrode, wherein an electrolyte layer of the composite electrolyte membrane is disposed in contact with the negative electrode, and a phase change layer is disposed in contact with the positive electrode, and wherein the composite electrolyte membrane is defined in any one of the first to sixth aspects.

According to an eighth aspect of the present disclosure, in the seventh aspect, the filler in the phase change layer may be liquefied and kept in the liquefied state by reaction with the lithium salt, and the liquefied filler material may be maintained to be filled in interfaces between the phase change layer and the electrolyte layer and between the phase change layer and the positive electrode.

The present disclosure further provides a method for manufacturing an all-solid-state battery. A ninth aspect of the present disclosure relates to the battery manufacturing method including (S1) preparing a negative electrode, (S2) forming a solid electrolyte layer on a surface of the negative electrode, (S3) preparing a porous sheet and filling the porous sheet with a liquid filler, (S4) cooling a result of (S3) to solidify the filler to form a phase change layer, (S5) stacking the phase change layer on the electrolyte layer, and (S6) preparing a positive electrode and stacking the positive electrode on the phase change layer.

According to a tenth aspect of the present disclosure, in the ninth aspect, the method may further include, before the step (S5), (S7) coating a lithium salt on the electrolyte layer to form a lithium salt layer.

According to an eleventh aspect of the present disclosure, in the ninth or tenth aspect, the method may further include (S8) heating the battery manufactured after the step (S6) and leaving the battery for a predetermined time to liquefy the filler.

Advantageous Effects

The composite electrolyte membrane according to the present disclosure includes the phase change layer on the surface in contact with the electrode, for example, the positive electrode. The phase change layer includes the filler, and a physically isolated area between the positive electrode and the composite electrolyte membrane, known as a dead space is filled with the filler that is liquefied by heat resulting from the increased internal temperature of the battery, thereby reducing the interfacial resistance between the electrolyte membrane and the electrode.

Additionally, as there is a decrease in the dead space at the interface between the composite electrolyte membrane and the electrode due to the filler in the phase change layer being liquefied, contact non-uniformity of the composite electrolyte membrane and the electrode surface reduces. Accordingly, it is possible to make a closer contact between the electrode and the porous polymer sheet layer, and reduce the interfacial resistance between the porous polymer sheet layer and the electrolyte layer.

The dead space in the electrode may be filled with the phase change layer when the filled filler is liquefied. Accordingly, it is possible to increase the ionic conductivity of lithium ions, reduce the resistance and improve the life performance of the battery.

The phase change layer forms a solid electrolyte interphase (SEI) film on the surface of the negative electrode by reaction between the liquefied filler in the phase change layer and the negative electrode active material layer in the negative electrode, thereby improving the life performance of the battery.

The filler in the phase change layer acts as a liquid electrolyte when liquefied, thereby increasing the ionic conductivity of the battery and improving the output of the battery.

The all-solid-state battery according to the present disclosure includes the porous sheet layer, and the porous sheet layer may prevent the softening of the polymer electrolyte that may occur in the electrolyte layer in contact with the liquid electrolyte that has undergone liquefaction and the consequential mechanical property degradation. Additionally, the porous sheet layer reduces the growth of lithium dendrites.

The present disclosure may provide the all-solid-state battery with improved safety.

BRIEF DESCRIPTION OF DRAWINGS

The accompanying drawings illustrate a preferred embodiment of the present disclosure, and together with the above detailed description, serve to provide further understanding of the technical aspects of the present disclosure, and thus, the present disclosure should not be construed as being limited to the drawings. Meanwhile, the shape, size, scale or proportion of the elements in the drawings as used herein may be exaggerated to emphasize clearer description.

BEST MODE

Figure 1A:
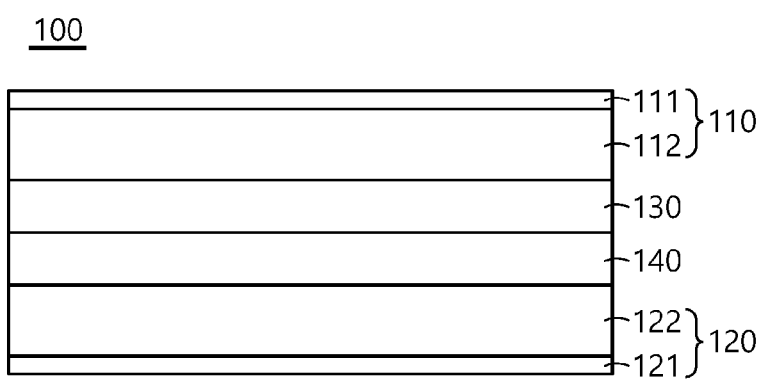
FIG. 1a is a schematic cross-sectional view of an all-solid-state battery according to an embodiment of the present disclosure.

Hereinafter, the present disclosure will be described in detail. It should be understood that the terms or words used in the specification and the appended claims should not be construed as limited to general and dictionary meanings, but interpreted based on the meanings and concepts corresponding to the technical aspects of the present disclosure on the basis of the principle that the inventor is allowed to define terms appropriately for the best explanation. Therefore, the embodiments described herein and illustration in the drawings are just a most preferred embodiment of the present disclosure, and they are not intended to fully describe the technical aspects of the present disclosure, so it should be understood that other equivalents and modifications could be made thereto at the time the application was filed.

It will be further understood that when an element is referred to as being connected to another element, it can be directly connected to the other element and it may be electrically connected to the other element with intervening elements interposed between.

It will be understood that about and substantially are used herein in the sense of at, or nearly at, when given the manufacturing and material tolerances inherent in the stated circumstances and are used to prevent the unscrupulous infringer from unfairly taking advantage of the disclosure where exact or absolute figures are stated as an aid to understanding the present disclosure.

It will be further understood that combination(s) thereof in Markush type language as used herein, refers to a mixture or combination of one or more selected from the group consisting of elements stated in Markush type language, and specifies the inclusion of one or more selected from the group consisting of the elements.

A and/or B when used in this specification, specifies either A or B or both.

Additionally, comprise, include and/or comprising, including when used in this specification, specifies the presence of stated features, integers, steps, operations, elements, components and/or groups thereof, but does not preclude the presence or addition of one or more other features, integers, operations, elements, components, and/or groups thereof.

An all-solid-state battery using a solid electrolyte, not a liquid electrolyte, includes a positive electrode and a negative electrode and an electrolyte membrane including a solid electrolyte, between the positive electrode and the negative electrode, and the electrolyte membrane acts as a separator to electrically isolate the positive electrode from the negative electrode and a safety device to prevent the battery from being overheated. Additionally, the electrolyte membrane is an ion conducting layer that allows lithium ions to move, so that the battery is charged and discharged.

However, since the electrolyte membrane is solid, there may be a gap between a battery component in contact with the electrolyte membrane, for example, the solid electrolyte membrane and the electrode, and the gap becomes a void having no ionic conductivity, i.e., a dead space. In this case, the electric current concentrates on areas other than the dead space, promoting the generation of lithium dendrites. Additionally, an internal short circuit may occur due to the dendrite growth.

To solve these problems, the present disclosure devises a composite electrolyte membrane including a phase change layer disposed on the surface of the electrolyte membrane.

Hereinafter, the present disclosure will be described in more detail with reference to the accompanying drawings.

In an embodiment of the present disclosure, the composite electrolyte membrane includes an electrolyte layer and a phase change layer stacked in that order. The composite electrolyte membrane is used as an electrolyte membrane for an all-solid-state battery, and the electrolyte layer includes a solid electrolyte material. Here, the phase change layer includes a porous sheet and a filler with which the pores of the porous sheet are filled, and the filler refers to a material that changes in phase between a solid state at room temperature or lower temperature and a flowable liquid state at temperature of 30° C. or above. In the specification, the room temperature ranges from 23° C. to 26° C., and may be 24° C. or higher within the above-described range. The composite electrolyte membrane may be disposed between the positive electrode and the negative electrode and applied as an electrolyte membrane for an all-solid-state battery. The phase change layer may be placed in contact with the electrode, for example, the positive electrode. FIG. 1a is a schematic cross-sectional view of the composite electrolyte membrane according to an embodiment of the present disclosure and the battery 100 comprising the same. Referring to FIG. 1a, the phase change layer 130 and the electrolyte layer 140 are interposed between the positive electrode 110 and the negative electrode 120, and the phase change layer is disposed in contact with the positive electrode.

The electrolyte layer includes a solid electrolyte material. The solid electrolyte material may include at least one of a polymer-based solid electrolyte, an oxide-based solid electrolyte and a sulfide-based solid electrolyte. The solid polymer electrolyte of the present disclosure plays a role in transporting lithium ions in the electrode, and thus the solid polymer electrolyte may include any substance of high ionic conductivity of, for example, $10^{-6}$ s/cm or more, $10^{-5}$ s/cm or more, or $10^{-4}$ s/cm or more.

In the present disclosure, the solid electrolyte material preferably includes a polymer-based solid electrolyte material. In an embodiment of the present disclosure, the polymer-based solid electrolyte may be a polymer solid electrolyte formed by adding polymer resin to a solvated lithium salt, an organic electrolyte solution containing an organic solvent and a lithium salt, or a polymer gel electrolyte containing an ionic liquid and monomers or oligomers in polymer resin. In a particular embodiment of the present disclosure, the polymer resin of the polymer-based solid electrolyte may include, for example, polyether-based polymer, polycarbonate-based polymer, acrylate-based polymer, polysiloxane-based polymer, phosphagen-based polymer, polyethylene derivatives, alkylene oxide derivatives such as poly ethylene oxide (PEO), phosphoric acid ester polymer, poly agitation lysine, polyester sulfide, polyvinyl alcohol, polyvinylidene fluoride and polymer containing ionic dissociation groups. Additionally, the polymer resin of the polymer solid electrolyte may include, for example, branched copolymer, comb-like polymer and crosslinked polymer formed by copolymerization of comonomers of amorphous polymer such as PMMA, polycarbonate, polysiloxane (pdms) and/or phosphagen into the main chain of PEO and a combination thereof.

Additionally, the polymer gel electrolyte includes an organic electrolyte solution containing a lithium salt and polymer resin, and the organic electrolyte solution is present in an amount of 60~400 parts by weight based on the weight of the polymer resin. The polymer applied to the gel electrolyte is not limited to a particular type, and may include, for example, polyether, PVC, PMMA, polyacrylonitrile (PAN), polyvinylidene fluoride (PVdF), poly(vinylidene fluoride-hexafluoropropylene) (PVdF-HFP), and a combination thereof.

In an embodiment of the present disclosure, the lithium salt may be represented by $Li^+X^-$. In a particular embodiment of the present disclosure, the cation of the lithium salt may include $Li^+$, and the anion may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $F_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$ and $(CF_3CF_2SO_2)_2N^-$.

In an embodiment of the present disclosure, when the electrolyte layer includes the polymer resin and the lithium salt, a mole ratio of the lithium salt and the polymer resin may be 1:5 to 1:30. For example, when the polymer resin is polyethyleneoxide, a mole ratio of [EO]:[Li$^+$] may range from 5:1 to 30:1.

The phase change layer includes the porous sheet and the filler with which the pores of the porous sheet are filled.

The porous sheet is a porous film or non-woven fabric including a polymer material, and has a plurality of pores. Particularly, the porous sheet may include, without limitation, any type that may be used as a separator material for an electrochemical device. The pores are connected to each other to allow a gas or a liquid to pass from one surface of the material to the other surface.

In an embodiment of the present disclosure, the porous sheet may be 5 μm to 50 μm in thickness. When the thickness of the porous sheet satisfies the above-described numerical range, the liquefied filler may sufficiently permeate, and the movement distance of lithium ions is short, which makes it possible to maintain a desired level of ionic conductivity of the composite electrolyte membrane.

The porous sheet may have porosity ranging from 30 vol % to 80 vol %. Within the above-described range, the porosity may be 60 vol % or less, 50 vol % or less, or 40 vol % or less, or 30 vol % or less. Additionally, within the above-described range, the porosity may be 20 vol % or more, 30 vol % or more, 40 vol % or more, or 60 vol % or more. For example, the porosity may be 30 vol % to 60 vol %. The filler used in the present disclosure may function as a plasticizer to soften the polymer material. Accordingly, when the porosity is too high, a large amount of liquefied fillers may flow into the electrolyte layer through the pores of the porous sheet, and when the electrolyte layer includes a polymer-based solid electrolyte, the solid electrolyte may be softened by the filler and the physical properties may be degraded. When the porosity is too low, the movement of lithium ions may decrease. Accordingly, when the porosity satisfies the above-described range, it is possible to prevent the softening of the electrolyte layer due to the liquefied filler passing through the pores of the porous sheet, and maintain a desirable level of ionic conductivity of the battery. In the present disclosure, the porosity may be measured by the following method. In an embodiment of the present disclosure, the porosity is measured by measuring the diameter of micropores filled with mercury in a predetermined pressure in accordance with the ASTM D 4284-92 standard. The micropores are measured at each predetermined pressure while the pressure between 0.5 psi and 60,000 psi is continuously applied, and at that time, the volume of the mercury filled in the separator is measured. The measurement is automatically performed, and the calculated value is outputted. The used instrument is Micrometrics Autopore IV 9500, and the measureable pore size range is 0.003 μm to 360 μm.

In a particular embodiment of the present disclosure, the porous sheet may include, but is not limited to, at least one of polyethylene; polypropylene; polybutylene; polypentene; polyhexene: polyoctene; and copolymer of at least two of ethylene, propylene, butene, pentene, 4-methylpentene, hexene and octene.

Additionally, the porous sheet may reduce the growth of lithium dendrite, and increase the mechanical strength of the composite electrolyte membrane. Presumably, it is because the porous polymer sheet layer itself acts as a support layer, and the porous polymer sheet layer includes the liquefied plasticizer and the lithium salt, hence, the pores in the porous polymer sheet layer are filled with them.

The filler may be used as an organic solvent for a liquid electrolyte in the art, and exists in a solid state at room temperature, and when the temperature rises, for example, in the condition of about 30° C., it melts and turns into a liquid.

In a particular embodiment of the present disclosure, the filler is kept in a solid state at room temperature or lower temperature, and when a specific temperature condition or above is reached by the increased internal temperature at the battery aging step or during operation of the battery, the filler melts and changes to a liquid. For example, aging is performed at about 60° C. for about 10 seconds after battery assembling, the filler may be liquefied. In this instance, the liquefied filler may act as a solvent of the lithium salt. That is, when the lithium salt comes into contact with the liquefied filler, it dissolves and becomes a liquid electrolyte. Meanwhile, when the temperature is lowered, the filler returns to a solid, but when the filler, after liquefied, is mixed with the lithium salt, the filler does not return to a solid and is kept in a liquid state in the event that the temperature falls below the melting point. This is because the melting point of the mixture of the filler and the lithium salt is lower.

In a particular embodiment of the present disclosure, when the filler becomes a liquid, the temperature of the battery does not need to be above the melting point of the filler during operation of the battery.

In a particular embodiment of the present disclosure, the filler may include ethylene carbonate, polyethylene glycol having the weight average molecular weight of 1,000 or above, succinonitrile or cyclic phosphate, and a combination of at least one of them. In the present disclosure, the melting point of ethylene carbonate is about 37° C., the melting point of polyethylene glycol (Mw 1000 or more) is about 35° C., the melting point of succinonitrile is about 57° C., and the melting point of cyclic phosphate is about 65° C.

Meanwhile, propylene carbonate (PC), and poly ethylene glycol (PEG), poly ethylene glycol dimethyl ether (PEGDME) and diethyl phthalate (DEP) having the weight average molecular weight of less than 1,000, in particular, 600 or less are materials used as an organic solvent for a liquid electrolyte, but they exist in a liquid state at room temperature, and thus they are not used as the filler of the present disclosure.

In a particular embodiment of the present disclosure, the filler may be ethylene carbonate. The ethylene carbonate has the melting point of about 37° C. and exists in a solid state at room temperature. The ethylene carbonate is liquefied at temperature above the melting point, and the liquefied ethylene carbonate may act as a liquid electrolyte to dissolve the surrounding solid lithium salt, and allows the introduction of less impurities. Particularly, the ethylene carbonate has high ionic conductivity and oxidation reactivity (6.2V) in a non-aqueous electrolyte solution, helping to improve the battery performance after the SEI film is formed.

Additionally, in an embodiment of the present disclosure, the lithium salt concentration in the liquefied filler may be about 0.05 mol % to 5.0 mol %, and within the above-described range, the lithium salt concentration may be 0.1 mol % or more, 0.5 mol % or more, 1.0 mol % or more or 2.0 mol % or more, and within the above-described range, the lithium salt concentration may be 4.0 mol % or less, 3.0 mol % or less, or 2.0 mol % or less. For example, the lithium salt concentration may be 0.1% to 2.5 mol %, 1.5 mol % to 2.5 mol %, or 1.0 mol % to 2.0 mol %.

Figure 1B:
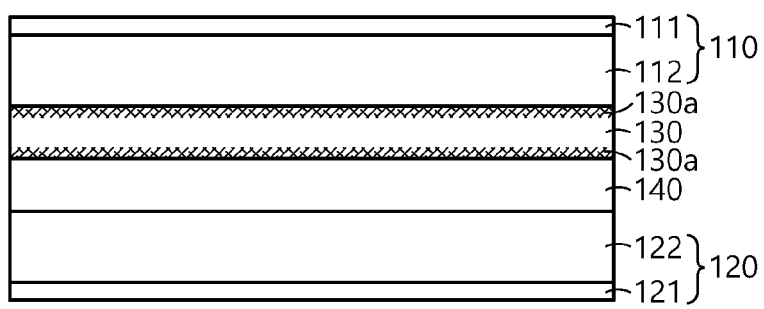
FIG. 1b is a schematic cross-sectional view of an all-solid-state battery according to an embodiment of the present disclosure, showing a filler of a phase change layer in a liquefied state.

When the lithium salt concentration satisfies the above-described range, the liquefied filler may not return to a solid in the event that the temperature falls down later. Additionally, when the lithium salt concentration satisfies the above-described range, the viscosity of the lithium salt in the liquefied mixture is appropriately maintained and the output at low temperature reduces, which is advantageous in terms of economical efficiency. Additionally, when the lithium salt concentration is within the above-described range, the ionic conductivity is suitable for use as a liquid electrolyte, and the concentration is suitable to reduce the resistance at the interface with the electrode. FIG. 1b is a schematic diagram of the filler of the phase change layer in a liquefied state. Referring to FIG. 1b, the phase change layer 130 and the electrolyte layer 140 are interposed between the positive electrode 110 and the negative electrode 120, and the phase change layer is disposed in contact with the positive electrode. Here, with the increasing internal temperature of the battery, the filler of the phase change layer 130 has a liquefied state 130a.

Meanwhile, in an embodiment of the present disclosure, of two surfaces of the electrolyte layer, all or at least part of a surface of the electrolyte layer in contact with the phase change layer may be coated with the lithium salt. As described previously, when the filler, after liquefied, is mixed with the lithium salt, the filler is kept in the liquefied state in the event that the temperature falls down. The surface coating of the electrolyte layer with the lithium salt allows the melted filler to be easily mixed with the lithium salt. Additionally, in another embodiment of the present disclosure, particularly, when a polymer-based solid electrolyte is used for the solid electrolyte material, the electrolyte layer may be formed by forming a second polymer resin layer without mixing the second polymer resin with the lithium salt, and coating the lithium salt on the surface of the second polymer resin layer to form a lithium salt layer. The lithium salt may include, without limitation, any type that can be mixed with the liquefied filler and exist in an ionized state, and a reference may be made to the foregoing description.

Figure 2A:
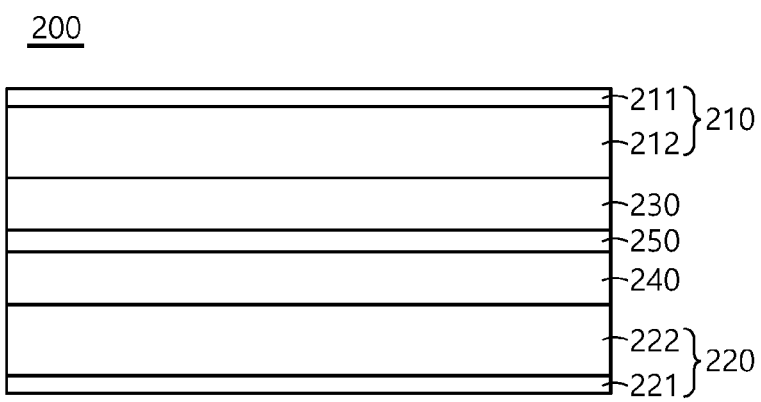
FIG. 2a is a schematic cross-sectional view of an all-solid-state battery according to an embodiment of the present disclosure.

FIG. 2a shows the composite electrolyte membrane including the electrolyte layer and the phase change layer 230 interposed between the positive electrode 210 and the negative electrode 220, in which the electrolyte layer includes the second polymer resin layer 240 and the lithium salt layer 250 stacked in that order and the lithium salt layer 250 is disposed in contact with the phase change layer 230, and the battery 200 comprising the same. Here, the second polymer resin layer may or may not include the lithium salt. The lithium salt layer is formed by coating all or at least part of the surface of the second polymer resin layer with the lithium salt.

Figure 2B:
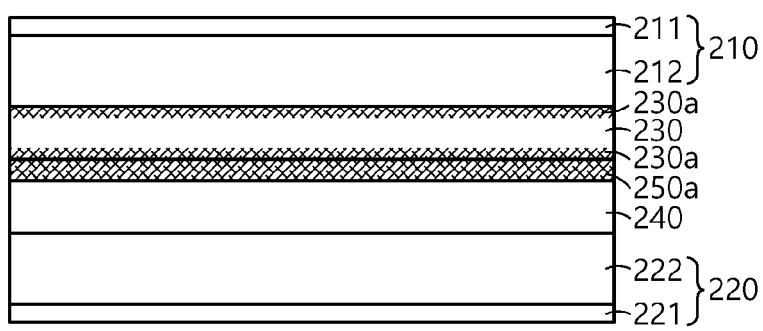
FIG. 2b is a schematic cross-sectional view of an all-solid-state battery according to an embodiment of the present disclosure, showing a filler of a phase change layer in a liquefied state.

As described above, in the composite electrolyte membrane according to the present disclosure, when the internal temperature of the battery rises during charging and discharging, the filler melts and turns into a liquid. Referring to FIG. 2b, the filter is liquefied (230a, 250a), and the phase change layer 230 is filled with the liquefied filter.

Subsequently, when the liquefied filler dissolves the surrounding lithium salt, the liquefied filler is mixed with the lithium salt, the filler does not return to a solid and may be kept in a liquid state in the event that the temperature falls down. The liquefied filler mixed with the lithium salt acts as a liquid electrolyte, thereby reducing the interfacial resistance between the electrode and the composite electrolyte membrane. Additionally, not only the pores of the porous sheet but also the dead space between the composite electrolyte membrane and the electrode are filled with the resulting liquid electrolyte, to eliminate the dead space having no ionic conductivity, thereby improving ionic conductivity and adhesion between the electrode and the composite electrolyte membrane.

Meanwhile, in the specification, turn to a liquid, liquefied, liquid state and liquefied state may refer to the change of the filler from a solid state to a flowable state after the filler melts.

The present disclosure further provides an all-solid-state battery comprising the composite electrolyte membrane. The all-solid-state battery includes a positive electrode, a negative electrode and the composite electrolyte membrane interposed between the positive electrode and the negative electrode, and preferably, the phase change layer is disposed in contact with the positive electrode.

In the present disclosure, the positive electrode includes a positive electrode current collector and a positive electrode active material layer on at least one surface of the current collector, and the positive electrode active material layer includes a positive electrode active material, a conductive material and a solid electrolyte. The positive electrode active material layer may further include binder resin if necessary. The positive electrode active material may include at least one of layered compounds such as lithium manganese composite oxide ($LiMn_2O_4$, $LiMnO_2$, etc.), lithium cobalt oxide ($LiCoO_2$), lithium nickel oxide ($LiNiO_2$) or compounds with one or more transition metal substitution; lithium manganese oxide of formula $Li_{1+x}Mn_{2-x}O_4$ (x=0~0.33), $LiMnO_3$, $LiMn_2O_3$, $LiMnO_2$, etc.; lithium copper oxide ($Li_2CuO_2$); vanadium oxide such as $LiV_3O_8$, $LiV_3O_4$, $V_2O_5$, $Cu_2V_2O_7$, etc.; Ni site-type lithium nickel oxide represented by chemical formula $LiNi_xCo_yMn_zO2$(x+y+z=1, 0<x<1, 0<y<1, 0<z<1), chemical formula $LiNi_{1-x}M_xO_2$ (M=Co, Mn, Al, Cu, Fe, Mg, B or Ga, x=0.01~0.3); lithium manganese composite oxide represented by chemical formula $LiMn_{2-x}M_xO_2$(M=Co, Ni, Fe, Cr, Zn or Ta, x=0.01~0.1), $Li_2Mn_3MO_8$(M=Fe, Co, Ni, Cu or Zn), $Li_aN-i_xMn_yCo_{1-x-y}O_2$ (0.5<a<1.5, x+y<1, 0<[x,y]<1); $LiMn_2O_4$ with partial substitution of alkali earth metal ion for Li in chemical formula; disulfide compounds; and $Fe_2(MoO_4)_3$.

In the present disclosure, the negative electrode includes a negative electrode current collector and a negative electrode active material layer on at least one surface of the current collector, and the negative electrode active material layer includes a negative electrode active material, a conductive material and a solid electrolyte. The negative electrode active material layer may further include binder resin if necessary. The negative electrode active material of the negative electrode may include, for example, at least one selected from lithium metal oxide, carbon such as non-graphitizable carbon, graphite based carbon; metal composite oxide such as $Li_xFe_2O_3$(0≤x≤1), $Li_xWO_2$(0≤x≤1), $Sn_xMe_{1-x}Me'_yO_z$(Me: Mn, Fe, Pb, Ge; Me': Al, B, P, Si, elements in Groups 1, 2 and 3 of the periodic table, halogen; 0<x≤1; 1≤y≤3; 1≤z≤8); lithium metal; lithium alloy; silicon based alloy; tin based alloy; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymer such as polyacetylene; Li—Co—Ni based material; and titanium oxide.

In a particular embodiment of the present disclosure, the conductive material may include, for example, at least one selected from the group consisting of graphite, carbon black, carbon fiber or metal fiber, metal powder, conductive whisker, conductive metal oxide, activated carbon and polyphenylene derivatives. In more detail, the conductive material may include at least one selected from the group consisting of natural graphite, artificial graphite, super-p, acetylene black, ketjen black, channel black, furnace black, lamp black, thermal black, denka black, aluminum powder, nickel powder, zinc oxide, potassium titanate and titanium oxide.

The current collector is not limited to a particular type and includes those having high conductivity while not causing a chemical reaction to the corresponding battery, and may include, for example, stainless steel, copper, aluminum, nickel, titanium, sintered carbon, or aluminum or stainless steel treated with carbon, nickel, titanium and silver on the surface.

The binder resin may include polymers commonly used in the electrode in the art. Non-limiting examples of the binder resin may include, but are not limited to, polyvinylidene fluoride-co-hexafluoropropylene, polyvinylidene fluoride-co-trichloroethylene, polymethylmethacrylate, polyethylhexyl acrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose.

The solid electrolyte included in the positive electrode or the negative electrode may include at least one selected from a polymer-based solid electrolyte, an oxide-based solid electrolyte and a sulfide-based solid electrolyte, and a reference may be made to the description of the electrolyte layer.

Meanwhile, the all-solid-state battery may be manufactured, for example, by the following method. First, a negative electrode is prepared, and an electrolyte layer is formed on the surface of the negative electrode. Subsequently, a phase change layer is formed on the surface of the electrolyte layer. The phase change layer is formed by melting a filler into a liquid that in turn, permeates the porous sheet, so that the porous sheet is filled with the liquid filler. Subsequently, the porous sheet filled with the filler is cooled to solidify the filler again. The prepared phase change layer is stacked on the surface of the electrolyte layer to form a composite electrolyte membrane. Subsequently, a positive electrode is prepared and stacked on the surface of the phase change layer. When an electrode assembly for an all-solid-state battery is obtained by this method, the electrode assembly is put into an appropriate case, and the case is sealed to manufacture an all-solid-state battery. Subsequently, the manufactured battery is introduced into an activation process, and undergoes aging and initial charging/discharging steps. In the activation process, the internal temperature of the battery may rise above the melting temperature of the filler, and accordingly, the filler of the porous sheet may be liquefied, and mixed with the lithium salt to keep it in the liquefied state.

Hereinafter, examples will be described in detail to particularly describe the present disclosure. However, the examples of the present disclosure may be modified in many other forms, and the scope of the present disclosure should not be construed as being limited to the following examples. The examples of the present disclosure are provided to fully explain the present disclosure to those having ordinary knowledge in the art to which the present disclosure pertains.

Example 1

1) Manufacture of Negative Electrode

A negative electrode active material (artificial graphite), polyethyleneoxide (PEO), LITFS1 as an electrolyte salt, a conductive material (Super C65), and styrene butadiene rubber (SBR) and carboxymethylcellulose (CMC) as a binder polymer are mixed at a weight ratio of 80:9:3.5:3:3: 1.5, and considering viscosity, a solvent acetonitrile (AN) is added to prepare a negative electrode active material slurry. The prepared negative electrode active material slurry is coated on a 20 μm thick copper current collector, and dried in vacuum at 100° C. for 24 hours to manufacture a negative electrode.

2) Manufacture of Composite Electrolyte Membrane

Polyethyleneoxide (PEO) is dissolved in acetonitrile (AN) to prepare a polymer solution containing 40 wt % of solids. The polymer solution is coated on the surface of the negative electrode to the thickness of about 40 μm using doctor blade and dried to form a polymer resin layer. Subsequently, LiTFSI at the concentration of 50 wt % is mixed with acetonitrile to prepare a coating solution, and the coating solution is coated on the surface of the polymer resin layer and dried to form an electrolyte layer. In this instance, the PEO and the lithium salt in the electrolyte layer have a ratio of [EO]:[Li$^+$] of 20:1 on the basis of mole concentration.

A 60° C. thermostat is prepared, and ethylene carbonate is put into the thermostat and melted. A porous sheet (polyethylene, porosity 40 vol %) is immersed in the prepared ethylene carbonate in a liquid state and left in a vacuum condition for about 12 hours, and in this instance, the temperature is maintained at 60° C. Subsequently, the porous sheet is placed at room temperature to solidify the ethylene carbonate filled in the porous sheet again. The pores of the porous sheet are filled with EC and two surfaces of the porous sheet are coated with EC. The used porous sheet is prepared in a round shape with the porosity of 45%, the thickness of about 10 μm and the diameter of about 15 mm, and the total amount of the ethylene carbonate filled in the sheet and coated on the surface is about 10 mg. The porous sheet obtained as described above is stacked on the electrolyte layer to manufacture a composite electrolyte membrane.

3) Formation of Positive Electrode

NCM811(LiNi$_{0.8}$Co$_{0.1}$Mn$_{0.1}$O$_2$) as a positive electrode active material, polyethyleneoxide (PEO) as a solid electrolyte, LITFSI as an electrolyte salt, a conductive material (VGCF) and binder polymer (PVDF) are mixed at 80:11:3: 3:3 (a weight ratio), and a solvent acetonitrile (AN) is added to prepare a positive electrode active material slurry with controlled viscosity.

The prepared positive electrode active material slurry is coated on a 20 μm thick aluminum current collector, and dried in vacuum at 120° C. for 24 hours to manufacture a positive electrode. The positive electrode is stacked on the surface of the composite electrolyte membrane to manufacture an electrode assembly, and a coincell is manufactured using the electrode assembly.

4) Battery Activation

The coincell obtained through the above-described 3) undergoes aging at 60° C. for about 1 hour.

Example 2

1) Manufacture of Negative Electrode

A negative electrode is prepared by the same method as example 1.

2) Manufacture of Composite Electrolyte Membrane

A mixture of polyethylene oxide (PEO) and LiTFSI ([EO]:[Li$^+$]=20:1, mole ratio) is prepared, and the mixture is coated on the surface of the negative electrode to the thickness of about 40 μm using doctor blade and dried to form an electrolyte layer.

A 60° C. thermostat is prepared, and ethylene carbonate (EC) is put into the thermostat and melted. A porous sheet (polyethylene, porosity 40 vol %) is immersed in the prepared ethylene carbonate in a liquid state and left in a vacuum condition for about 12 hours, and in this instance, the temperature is maintained at 60° C. Subsequently, the porous sheet is placed at room temperature to solidify the ethylene carbonate filled in the porous sheet again. The pores of the porous sheet are filled with EC and two surfaces of the porous sheet are coated with EC. The used porous sheet is prepared in a round shape with the porosity of 45 vol %, the thickness of about 10 μm and the diameter of about 15 mm, and the total amount of the ethylene carbonate filled in the sheet and coated on the surface is about 10 mg. The porous sheet obtained as described above is stacked on the electrolyte layer to manufacture a composite electrolyte membrane.

3) Formation of Positive Electrode

A positive electrode is formed by the same method as example 1 and stacked on the surface of the composite electrolyte membrane to manufacture a battery.

4) Battery Activation

The coincell obtained through the above-described 3) undergoes aging at 60° C. for about 1 hour.

Example 3

A battery is manufactured by the same method as example 2 except that the filler is succinonitrile (SN), not ethylene carbonate.

Comparative Example

A battery is manufactured by the same method as example 2 except that the phase change layer is not formed.

Experimental Example (1) Measurement of Capacity Retention

Figure 3:
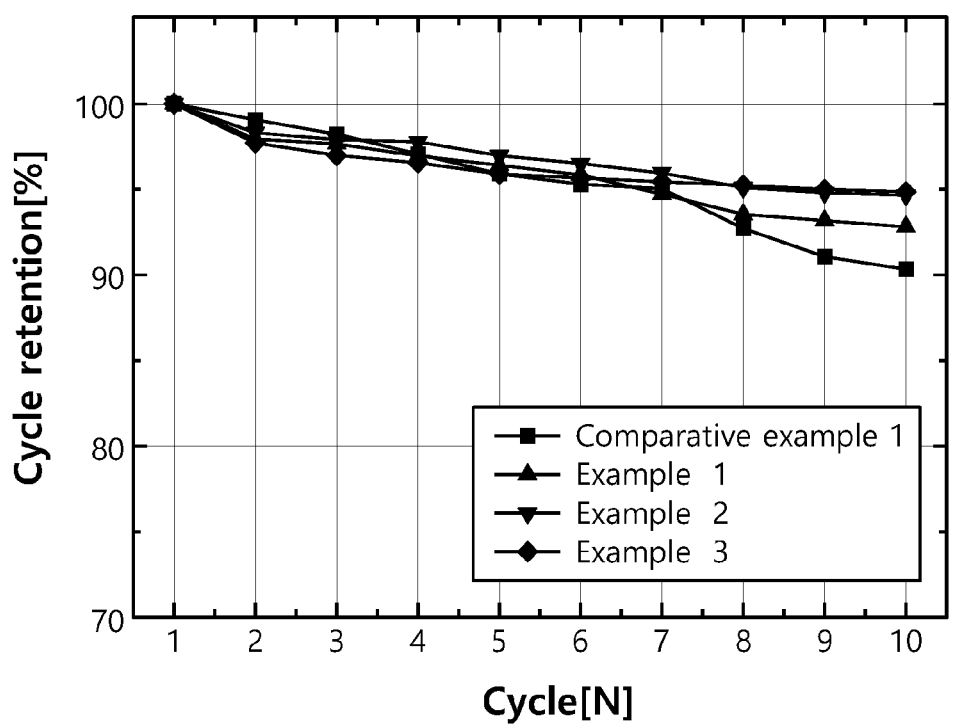
FIG. 3 shows the experiment results of capacity retention evaluation of batteries according to examples and comparative example of the present disclosure.

The lithium metal batteries of examples and comparative example are charged at room temperature in CC-CV mode at 0.1C up to 4.25V and discharged in CC mode at 0.1C down to 3V, and after 10 cycles are repeated, capacity retention is determined. Its results are shown in FIG. 3.

It is found that examples 1 to 3 have better capacity retention than comparative example.

(2) Measurement of Porosity

The porosity is measured by measuring the diameter of micropores filled with mercury in a predetermined pressure in accordance with the ASTM D 4284-92 standard, and the micropores are measured at each predetermined pressure while the pressure between 0.5 psi and 60,000 psi is continuously applied, and at that time, the volume of the mercury filled in the separator is measured. The measurement is automatically performed, and the calculate value is outputted. The used instrument is Micrometrics Autopore IV 9500, and the measureable pore size range is from 0.003 μm to 360 μm.

(3) Measurement of Pore Diameter

The mean flow pore size (MFPS) and the maximum pore size are measured using automated capillary flow porometer [PMI(Porous Materials Inc.), Model CFP-1200AEL (CFP-34RTF8A-X-6-L4)]. A wetting fluid used in the measurement is galwick acid (surface tension 15.9dynes/cm). The diameter of an adapter plate is 21 mm, and the used measurement method is wet-up/dry-up.

DESCRIPTION OF SYMBOLS

100 battery; 110, 210 positive electrode; 111, 211 current collector of positive electrodes; 112, 212 active material layer of positive electrode; 140 electrolyte layer; 120, 220 negative electrode; 121, 221 current collector of negative electrodes; 122, 222 active material layer of negative electrode; 230, 130 phase change layer; 230a, 130a phase change layer filled with filler; 250 lithium salt layer; 250a lithium salt layer after being dissolved in the filler; 240 electrolyte layer.

What is claimed is:

1. A composite electrolyte membrane for a battery, comprising:
    an electrolyte layer and a phase change layer stacked in a sequential order,
    wherein the phase change layer comprises a porous sheet including pores, and wherein the pores of the porous sheet are filled with a filler,
    wherein the porous sheet includes a first polymer resin, and the filler exists in a solid state at 26° C. or less and a liquid state at 35° C. or above, and
    wherein the electrolyte layer comprises a polymer-based solid electrolyte,
    wherein the electrolyte layer comprises a second polymer resin layer and a lithium salt layer,
    wherein the lithium salt layer is formed by coating a lithium salt on all or at least part of a surface of the second polymer resin layer that is in contact with the phase change layer.

2. The composite electrolyte membrane for the battery according to claim 1, wherein the filler comprises at least one selected from the group consisting of ethylene carbonate (EC), polyethylene glycol (PEG) having a weight average molecular weight of 1,000 or above, succinonitrile (SN), and cyclic phosphate (CP).

3. The composite electrolyte membrane for the battery according to claim 1, wherein the electrolyte layer further comprises at least one selected from the group consisting of a sulfide-based solid electrolyte, and an oxide-based solid electrolyte.

4. The composite electrolyte membrane for the battery according to claim 1, wherein the second polymer resin comprises at least one selected from the group consisting of polyether-based polymer, polycarbonate-based polymer, acrylate-based polymer, polysiloxane-based polymer, phosphagen-based polymer, a polyethylene derivative, an alkylene oxide derivative, phosphoric acid ester polymer, polyalginate lysine, polyester sulfide, polyvinyl alcohol, and polyvinylidene fluoride, and wherein the lithium salt and the polymer resin are mixed at a mole ratio of 1:5 to 1:30.

5. The composite electrolyte membrane for the battery according to claim 1, wherein the porous sheet is a film or a non-woven fabric, wherein the non-woven fabric comprises a polyolefin-based polymer resin, and wherein the film or non-woven fabric has a porosity of 30 vol % to 80 vol %.

6. A battery, comprising:
    a negative electrode,
    a positive electrode and
    the composite electrolyte membrane according to claim 1;
    wherein the composite electrolyte membrane is interposed between the negative electrode and the positive electrode, and
    wherein the electrolyte layer of the composite electrolyte membrane is disposed in contact with the negative electrode, and the phase change layer is disposed in contact with the positive electrode.

7. The battery according to claim 6, wherein the filler in the phase change layer is liquefied and kept in a liquefied state by reaction with a lithium salt, and a liquefied filler material is maintained to be filled in interfaces between the phase change layer and the electrolyte layer and between the phase change layer and the positive electrode.

8. A method for manufacturing the battery of claim 6, comprising:
   (S1) preparing a negative electrode;
   (S2) forming a solid electrolyte layer comprising a second polymer resin layer on a surface of the negative electrode;
   (S3) preparing a porous sheet and filling the porous sheet with a liquid filler;
   (S4) cooling a result of (S3) to solidify the liquid filler to form a phase change layer;
   (S5) stacking the phase change layer on the electrolyte layer; and
   (S6) preparing a positive electrode and stacking the positive electrode on the phase change layer; and
   further comprising before (S5): (S7) coating a lithium salt on the second polymer resin layer to form a lithium salt layer.

9. The method for manufacturing the battery according to claim 8, further comprising:
   (S8) heating the all-solid-state battery manufactured after the step (S6) and leaving the battery for a predetermined time to liquefy the liquid filler.

\* \* \* \* \*